United States Patent
Heiland et al.

(10) Patent No.: US 11,921,912 B1
(45) Date of Patent: Mar. 5, 2024

(54) MANIPULATING INTER-CHIP COMMUNICATIONS FOR IOT SECURITY

(71) Applicant: Rapid7, Inc., Boston, MA (US)

(72) Inventors: Deral Heiland, Xenia, OH (US); Matthew Kienow, Dayton, OH (US); Pearce Barry, Cedar Park, TX (US)

(73) Assignee: Rapid7, Inc., Boston, MA (US)

( * ) Notice: Subject to any disclaimer, the term of this patent is extended or adjusted under 35 U.S.C. 154(b) by 200 days.

(21) Appl. No.: 17/670,594

(22) Filed: Feb. 14, 2022

(51) Int. Cl.
*G06F 21/87* (2013.01)
*G06F 21/35* (2013.01)
*G06F 21/60* (2013.01)
*G06F 21/62* (2013.01)

(52) U.S. Cl.
CPC .............. *G06F 21/87* (2013.01); *G06F 21/35* (2013.01); *G06F 21/606* (2013.01); *G06F 21/6218* (2013.01)

(58) Field of Classification Search
CPC ........ G06F 21/87; G06F 21/35; G06F 21/606; G06F 21/6218
See application file for complete search history.

(56) References Cited

U.S. PATENT DOCUMENTS

| | | | |
|---|---|---|---|
| 10,516,710 B2* | 12/2019 | Levi | H04L 65/61 |
| 10,812,526 B2* | 10/2020 | Apelewicz | H04L 9/0861 |
| 2023/0216947 A1* | 7/2023 | Bernardi | H04L 63/10 |
| | | | 713/150 |

* cited by examiner

*Primary Examiner* — Han Yang
(74) *Attorney, Agent, or Firm* — Ashwin Anand

(57) ABSTRACT

Inter-chip communication data in an Internet-of-Things (IoT) device is manipulated and analyzed to identify and remediate security vulnerabilities. Inter-chip communication data in the IoT device is captured. Communication direction, address format, flow control, communication timing, and communication structure associated with the inter-chip communication data is identified. Based on the foregoing identification(s), portions of the inter-chip communication data that require modification are identified so that that inter-chip communication data can be replayed. Based on the modification and the replaying, security vulnerabilities in the IoT device are identified and remediated.

7 Claims, 9 Drawing Sheets

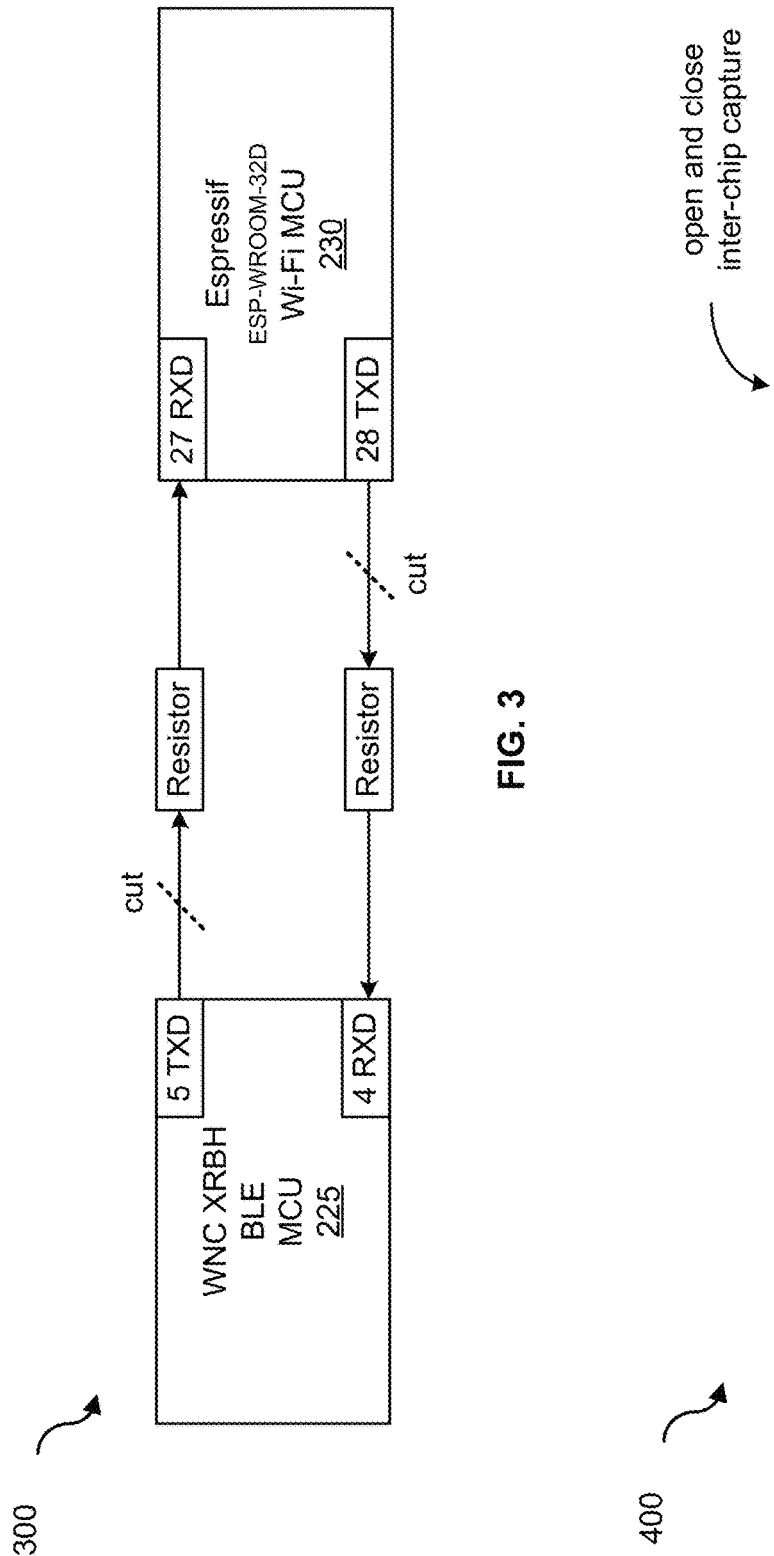

OPEN:
41 00 03 C8 28 3A 64 8C 45 5A
41 E5 EA C8 28 3A 64 8C 45 5A

Open responses from BLE MCU

CLOSE:
41 01 06 C8 28 3A 64 8C 45 5A
41 E0 EA C8 28 3A 64 8C 45 5A

Close responses from BLE MCU

```
Encoded MAC Address          Return Message 22 9e 26 a0 ea 19 70 85  =  CD AA 85 CE 2F 6D 20 9e 26 a0 ea 19 70 85  =  4D AA 85 CE 2F 6D 22 9C 26 a0 ea 19 70 85  =  8D AA 85 CE 2F 6D 22 9e 24 a0 ea 19 70 85  =  ED AA 85 CE 2F 6D 22 9e 26 9e ea 19 70 85  =  DD BA 95 DE 3F 6D 22 9e 26 a0 ea 19 70 85  =  C5 AA 85 CE 2F 6D 22 9e 24 a0 ea 17 70 85  =  C9 AE 81 CE 2F 6D 22 9e 26 a0 ea 19 6e 85  =  CF A8 87 CC 2F 6D 22 9e 26 a0 ea 19 70 83  =  CC AB 85 CE 2F 6D
```

*UART fuzzing response table*

- Message Start Delimiter (1 Byte)
- Device Command (2 Bytes)
- Encoded MAC address (8 Bytes)
- Unknown - Possible Validation Key (8 Bytes)
- CheckSum8 Modulo Plus 1 (1 Byte)

77 00 00 9E 9E 5E 28 32 13 4C AF 5F EA DF 92 A4 7A 98 D6 C0

*Identified message structure*

MANIPULATING INTER-CHIP COMMUNICATIONS FOR IOT SECURITY

BACKGROUND

Field of the Disclosure

This disclosure is related to Internet of Things (IoT) security. In particular, this disclosure is related to methods and systems that facilitate inter-chip communication data analysis and manipulation to identify security vulnerabilities.

Description of the Related Art

The Internet of things (IoT) describes physical objects (or groups of such objects) that are embedded with sensors, processing ability, software, and other technologies that connect and exchange data with other devices and systems over the Internet or other communications networks. IoT has evolved due to the convergence of multiple technologies, including ubiquitous computing, commodity sensors, increasingly powerful embedded systems, and machine learning. Traditional fields of embedded systems, wireless sensor networks, control systems, automation, independently and collectively enable the Internet of things.

There are a number of concerns about the risks in the growth of IoT technologies and products, especially in the areas of privacy and security, and consequently, industry and governmental moves to address these concerns have begun, including the development of international and local standards, guidelines, and regulatory frameworks. In particular, securing IoT networks and devices from malicious attacks is a paramount concern in modern cybersecurity computing ecosystems.

Security in IoT involves securing Internet devices and the networks they're connected to from threats and breaches by protecting, identifying, and monitoring risks, while helping fix vulnerabilities from a range of devices that can pose significant security risks to modern businesses and organizations.

SUMMARY OF THE DISCLOSURE

Disclosed herein are methods, systems, and processes to manipulate inter-chip communications for IoT security. One such method, system, or process involves at least capturing inter-chip communication data in an Internet of Things (IoT) device, identifying a communication direction, an address format, a flow control, a communication timing, and a communication structure associated with the inter-chip communication, and based on the communication direction, the address format, the flow control, the communication timing, and the communication structure, identifying one or more portions of the inter-chip communication data that require modification so that the inter-chip communication data can be replayed, identifying one or more security vulnerabilities based on the modification and the replaying, and remediating the one or more security vulnerabilities in the IoT device.

In one embodiment, the method, system, or process involves serializing the captured inter-chip communication data to a file system associated with the IoT device. In another embodiment, the data communication structure includes a data transmission unit start delimiter, a data transmission unit end delimiter, and at least a length pattern.

In some embodiments, one or more portions of the inter-chip communication data are identified for modification based on data pattern recognition, and one or more portions of the inter-chip communication data are modified based on one or more sets of replacement patterns.

In other embodiments, the IoT device is communicatively coupled to a breakout board.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

FIG. 3 is a is a circuit block diagram 300, according to one embodiment of the present disclosure.

FIG. 4 is a block diagram 400 that illustrates an open and close inter-chip capture scenario 400, according to one embodiment of the present disclosure.

FIG. 5 is a block diagram 500 that illustrates open responses from a BLE MCU, according to one embodiment of the present disclosure.

FIG. 6 is a block diagram 600 that illustrates close responses from a BLE MCU, according to one embodiment of the present disclosure.

FIG. 7 is a block diagram 700 that illustrates a MAC address encoding, according to one embodiment of the present disclosure.

FIG. 8 is a block diagram 800 that illustrates a UART fuzzing response table, according to one embodiment of the present disclosure.

FIG. 9 is a block diagram 900 that illustrates an identified message structure, according to one embodiment of the present disclosure.

Figure 1:
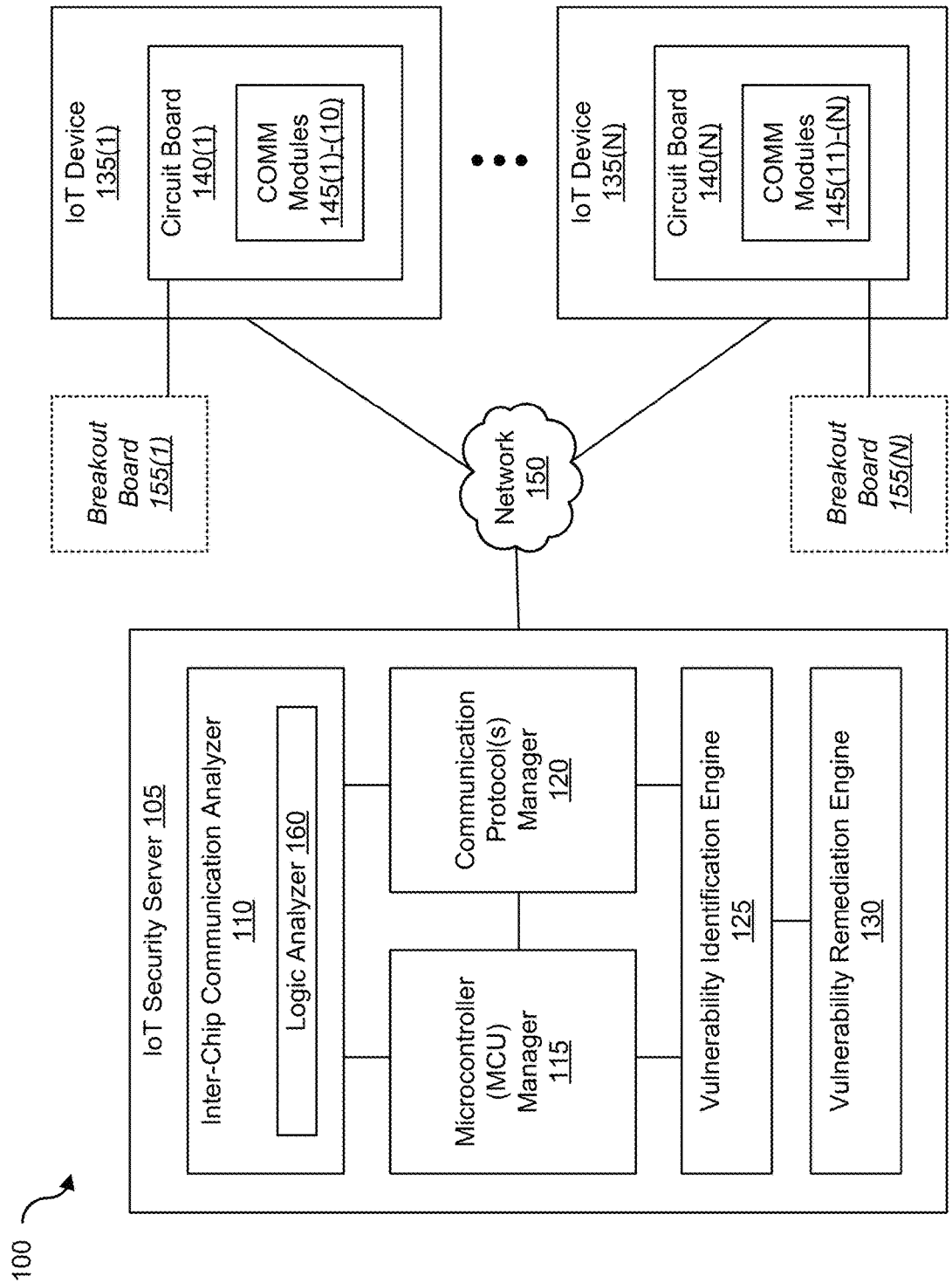
FIG. 1 is a block diagram 100 of an Internet of Things (IoT) security server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

When evaluating security of Internet of Things (hereinafter IoT) technology, communication leveraging industry-standard encryption is important. Encrypted communication to and from sensors and actuators is critical to maintaining proper security within a product's ecosystem; the same goes for encryption that bridges technology, cloud services, and Application Programming Interfaces (APIs). Therefore, when encountering devices leveraging encryption, it is crucial to understand whether there are alternate methods, systems, and processes for examining IoT technologies that could provide deeper insight into the end-to-end security of the product's ecosystem. The evaluation of an embedded product's end-to-end security can often be greatly enhanced by examining data transfer at the circuit level via inter-chip communication as data passes through an embedded device. At the circuit level, communication between microcontrollers (MCU) is rarely encrypted; this can be used as an effective testing point on bridging devices. These devices provide Internet connectivity and remote management capabilities for IoT sensors and actuators. They utilize non-internet routable communication protocols such as Bluetooth Low Energy (BLE). It is common to see multiple MCUs in use within bridging devices.

Example IoT Security Server and IoT Device

In some embodiments, IoT security server 105, which can be any type of physical or virtual computing device, facilitates at least (1) circuit board layouts and communication path tracing, (2) capturing of inter-chip communication, and (3) decoding and analysis of inter-chip communication (e.g., for security operations such as vulnerability identification and remediation, among others). In certain embodiments, MCU manager 115 can determine whether chips or MCUs on one or more IoT devices (e.g., shown as COMM Modules 145(1)-(N) on IoT devices 135(1)-(N)) are Ball Grid Array (BGA) chips or non-BGA chips and can also determine whether circuit boards 140(1)-(N) are multi-layered or just dual-layered.

Figure 2:
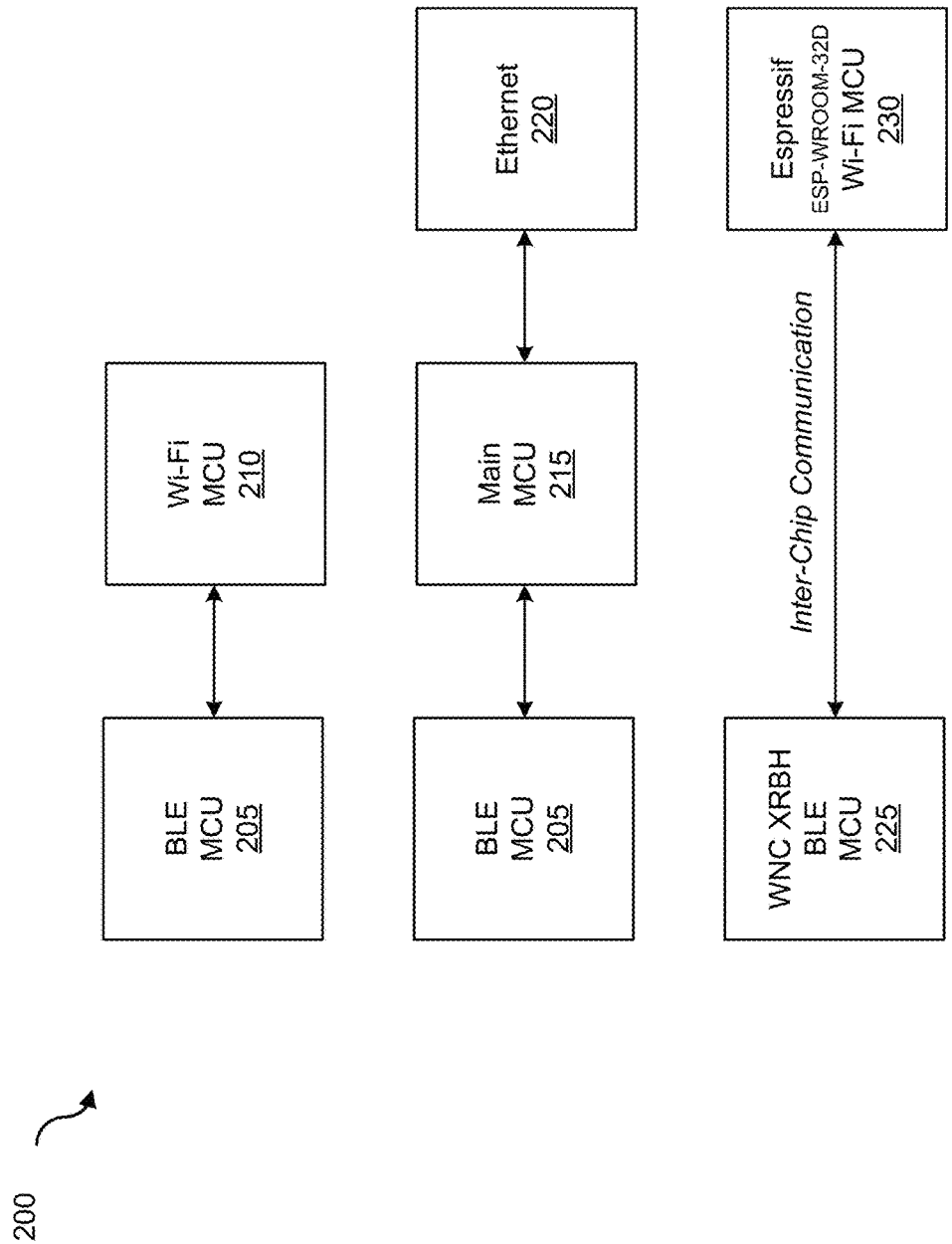
FIG. 2 is a block diagram 200 of a communication flow illustrating inter-chip communication in an IoT device, according to one embodiment of the present disclosure.

In one embodiment, IoT device 135(1) is a BLE bridge device, which can add remote capability to a customer-based door lock. Such a BLE bridge device can include multiple communication protocols and paths (e.g., Wi-Fi, Ethernet, or some form of non-Internet routable radio frequency (RF) communication used to control IoT sensors and/or actuators). In this example, with multiple paths, the BLE bridge device's circuit design can leverage different MCUs for each communication protocol, allowing for inter-chip communication analysis (e.g., as shown in FIG. 2, which illustrates an exemplary inter-chip communication flow). IoT security server 105 can identify and catalog the MCUs that are being used by IoT device 135(1) (e.g., using MCU manager 115, as shown in FIG. 1).

In one embodiment, IoT security server 105 determines that each communication method (e.g., Wi-Fi and BLE) uses a different communication module (e.g., a different MCU—COMM module 145(1) and 145(2) on IoT device 135(1)). IoT security server 105 access one or more datasets that include device communication data (e.g., XRBH) and identifies the producer or manufacturer of each COMM module and it's corresponding pinout (e.g., Winstron NewWeb Corp (WNC) for the actual MCU and Nordic nRF51822 for the BLE MCU, among others). In addition, and for example, IoT security server 105 can also identify that for network and internet connectivity, an Espressif module 'ESP-WROOM-32D on IoT device 135(1) supports the Wi-Fi 802.11 communication protocol.

In some embodiments, IoT security server 105 identifies the inter-chip communication method being used and traces out the connection on the circuit board between the two MCUs. Host communication access to BLE MCUs in this example is performed via Universal Asynchronous Receiver Transmitter (UART). Based on the one or more datasets referenced above (e.g., Federal Communications Commission (FCC) datasets, among others), IoT security server 105 identifies the pinout and UART (e.g., Pin 4— UART RXD and Pin 5— UART TXD). IoT security server 105 traces the UART from UART RXD (receive data) pin4 and TXD (transmit data) pin 5 to the other MCU (e.g., Espressif ESP-WROOM-32D as shown in FIG. 2). Similarly, using a dataset for the Wi-Fi MCU, IoT security server 105 identifies pins that support general purpose input/output (I/O) capabilities. In this manner, tracing back from BLE modules to the Wi-Fi module is a practical method to identify the UART port pinout in the Wi-Fi MCU for the inter-chip communication (e.g., Pin 28 with description GPIO17, HS1_DATA5, U2TXD, EMAC_CLK_OUT_180 and Pin 27 with description GPIO, HS1_DATA4, U2RXD, EMAC-_CLK_OUT). If the dataset is unavailable or inaccessible for any reason, IoT security server 105 can implement and utilize a logic analyzer (e.g., logic analyzer 160 as shown in FIG. 1) and a trial-and-error method to identify the proper UART communication channels between the MCUs.

In certain embodiments, IoT security server 105 expands the testing environment to (a) capture communication, (b) replay communication, and (c) fuzz communication. Once the inter-chip communication is traced out, IoT security server 105 instructs the IoT device or a user of the IoT device to cut the circuit runs and reroute communication flow off the circuit board to a breakout board for analysis (e.g., from circuit board 140(1) to breakout board 155(1)). In this example, the breakout board is an extension of the circuit board. To cut and redirect the circuit to the proper side of the resistor, IoT security server 105 instructs the IoT device or the user of the IoT device to cut the circuit on the TXD side of the resistor (e.g., as shown in FIG. 3). The foregoing ensures that interaction with the bridge devices UART inter-chip communication does not interfere with the impedance matching delivered by the inline resistors to the receiving module. In this manner, IoT security server 105 can cause IoT devices 135(1)-(N) to configure themselves for capturing, decoding, and analysis of inter-chip communication.

Example of Inter-Chip Communication in IoT Devices

Once inter-chip communication (hereinafter simply "communication") is routed out to a breakout board (e.g., breakout board 155(1) as shown in FIG. 1), IoT security server 105 can start capturing the communication for analysis and testing. In one embodiment, logic analyzer 160 is used to evaluate the communication and determine the speed, settings, and general message structure. Implementing logic analyzer 160 permits IoT security server 105 to identify the beginning and end of message structures used to send command and control packets between MCUs based on timing, further permitting the delimiting of such messages for decoding. Identifying starting delimiters permits better parsing of the communication and further analysis.

Communication protocol manager 120 receives and/or accesses an open and close command message sent to a lock from the Internet (e.g., captured passing from the Wi-Fi MCU to the BLE MCU). As shown in FIG. 4, the difference between the open and close commands is the second and last byte. With the second byte (bolded and underlined in FIG. 4), 00 is for open and 01 is for close. The last byte (bolded and italicized in FIG. 4) is the checksum (e.g., C0 and C1). Inter-chip communication analyzer 110 determines that security validation, such as key or packet signaling, if fixed data. Because IoT security server 105 has access to inter-chip communication, changes can be made and the data within the inter-chip communication replayed.

However, in certain embodiments, prior to conducing a replay or fuzzing-type test, IoT security server 105 examines the response from the BLE MCU and determines the content of the data. An example of the foregoing is illustrated in FIGS. 5 and 6. In this example, each command send to the BLE MCU (e.g., BLE MCU 205) results in two responses, each 10 bytes in length. The bytes shown italicized are the actual Media Access Control (MAC) address of the BLE radio on the door lock. The bolded byte is the response type. IoT security server 105 determines that the first 10-byte message (e.g., 41 00 03 C8 28 3A 64 8C 45 5A) acknowledges that an 'open' command is received and the second 10-byte message (41 E5 EA C8 28 3A 64 8C 45 5A) indicates the lock position status after the execution of the 'open' command.

Using the captured open-and-close message, IoT security server 105 starts altering the data one byte at a time to determine whether any of the data is associated with the BLE MCU address that is echoed in the response message. In this fuzzing example, IoT security server 105 determines that the MAC address is encoded in the initial command message being sent from the Internet. After fuzzing through all the bytes, IoT security server 105 determines that the 8 bytes shown bolded (and in a rectangle) in FIG. 7 are being used to encode the MAC address. For example, each time one of the bytes inside the rectangle box in FIG. 7 chances, the responding message from the BLE MCU chances the MAC address within the response. The responding messages are an error response, as the MAC address does not match the MAC address of the configured BLE lock device. IoT security server 105 can use this sample data to determine the encoding message used so that it can be reproduced.

FIG. 8 illustrates information gathered from altering the encoded MAC address and replaying it in an open or close request messaged, followed by the actual MAC address returned in the response message. The greyscale text in the left column shows the bytes altered, and the greyscale text in the right column shows the changes to the returned response messages. In this example, the specific MAC address (CD:AA:85:CE:2F:6D) is used in a second home BLE lock device. Once a block of data is gathered, the data is converted into binary, and a rough encoding map being used is determined. This permits IoT security server 105 to recreate an encoded 8-byte string from the known MAC address. The purpose of using the second home BLE lock is to determine whether the lock can be targeted from the example bridge device without configuring or syncing the product's cloud service.

Based on the foregoing test, at least the following security concerns exist and may be applicable to other IoT technologies and devices. First, the key received by the lock and used to validate the message if fixed and never changes. Second, the length of that key is, at best, 8 bytes. This is based on the identified structure shown in FIG. 9. Third, this key contains a shared secret, which is based on the registration number of the BLE door-lock device at the time it is set up with cloud services. Thus, if a shared secret can be comprised or is predictable, this information can have an adverse impact on the product's (e.g., IoT device 135(1)) end-to-end security.

Example Inter-Chip UART Proxy (Akheron Proxy)

In certain embodiments, IoT security server 105 at least (a) permits a user to set the incoming and outgoing serial connection, (b) permits the user to set the message start- or ending-byte that allows for a multibyte setting, (c) permits for displaying of UART data in real time as it passes through the application MiTM (man in the middle) function, (d) permits for data to be captured to a file (e.g., during the capture, data can be tagged with direction, A→B, A←B, and messages can be numbered in order received, (e) permits the user to replay captured data using message direction and numbered messages, and (f) permits users to do a byte identification and replace on data being replayed (e.g., if AF E6 33 is found in a message, it can be replaced with FF 01 D8 during replay of captured data; in addition, support for simple message checksum updates permits messages with replaced data to validate with the receiving device and permits for a simple fuzzing function using the captured data).

Figure 10:
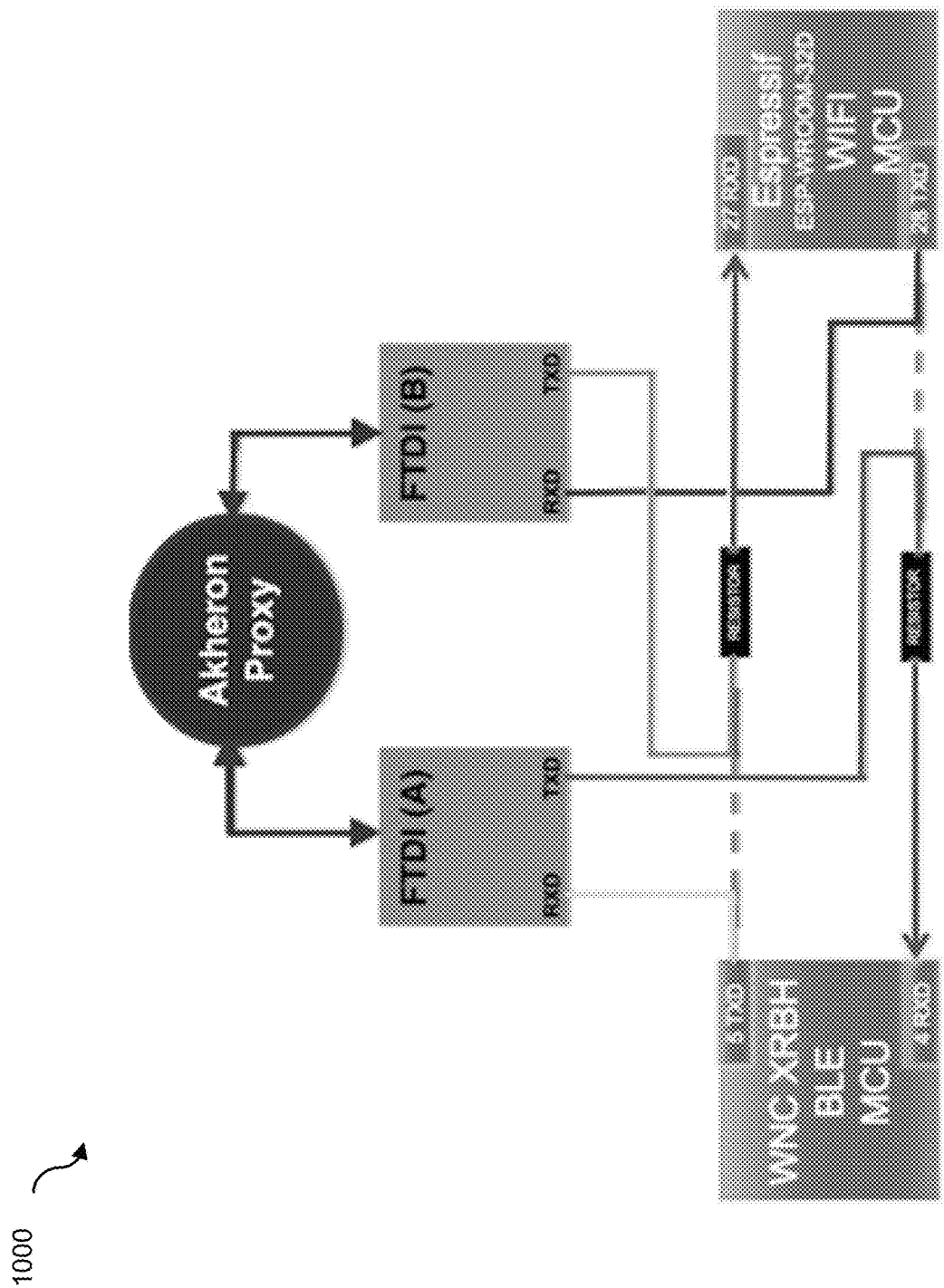
FIG. 10 is a block diagram 1000 that illustrates the Akheron Proxy, according to one embodiment of the present disclosure.

FIG. 10 is a block diagram of the Akheron Proxy (shown as inter-chip communication analyzer 110 in FIG. 1). In one embodiment, the Akheron proxy tool ("the application") requires two Universal Serial Bus (USB) devices to be hooked up to Serial FTDI devices to the breakout board. In this example, TXD hooks to RXD and RXD hooks to TXD. Since two FTDI devices are being connected, data is received on FTDI (A) and then retransmitted out of FTDI (B). Data following in the opposite direction is received on FTDI (B) and retransmitted out of FTDI (A). Next, the FTDI devices can be set up (e.g., ttyUSB0 and ttyUSB1) using a 'portset' command. Once serial devices are connected within the application, the delimiter is enabled to let the application know that the starting or ending byte(s) are for the communication messages (e.g., starting delimiters for messages can be 0x77 and 0x41).

Once FTDI and delimiters are set, in one embodiment, the MiTM passthrough is started and 'watch' is enabled to see traffic passing through the MiTM proxy. In this example, capture and replay are also enabled. For example, capture tags the messages with both direction and a sequential number. When replayed, the message can be selected for replay by specifying the number(s). A close and then an open command can be replayed and received responses from the BLE MCU can be displayed.

In certain embodiments, IoT security server 105 performs a replace on replay feature. This permits alteration of MAC addresses or authentication tokens to trigger adverse effects on targeted devices and services. Also, because any alteration of messages may require a recalculation of CRC (cyclic redundancy check), a few CRC types can be added (e.g., 8-bit CRC options). For example, the pattern 0x77 0x01 0x00' can be matched on a message being transmitted from PORT B and replacing it with '0x77 0x07 0x00' during a replay operation of captured data.

Example of Manipulating Inter-Chip Communications for IoT Security

Security analysts of networked computer devices is typically limited to externally exposed communications which are frequently encrypted, prevent any deep device communication analysis, analysis of end-to-end functionality or security testing. Advantageously, according to various embodiments, the inter-chip communication data analysis and manipulation system of FIG. 1 (e.g., IoT security server 105) permits for the capture, analysis, modification, and replay of communication between different microcontroller units (MCUs) within a system or device's circuit design. This lower level access to the device's communication is most often unencrypted and permits for deeper insight and testing of the device's functions, capabilities, overall security posture, and the ability to facilitate automated testing procedures.

In certain embodiments, the system of FIG. 1 discloses a system of capturing, analysis, modification, and replay of inter-chip communication between different MCUs within a system's circuit design for the purpose of analyzing device behavior and subsequent inter-chip communication, identifying sensitive data communicated, aid in analysis of overall system security, vulnerability discovery, and facilitate automated testing features and functions. For example, such inter-chip communication is analyzed and manipulated (e.g., as indicated above) by vulnerability identification engine 125 to identify security vulnerabilities in IoT devices (e.g., IoT devices 135(1)-(N)) and vulnerability remediation engine 130 remediates the discovered and identified vulnerabilities. These methods and systems of inter-chip communication data analysis and manipulation permits a lower level method of analysis by connection into the communication flowing between MCUs within the circuit design, which permits testers to gain access below typical encrypted communication levels on a device for the purpose of capture, analysis, modification, and replay of inter-chip communication data.

In one embodiment, the inter-chip communication data analysis and manipulation system of FIG. 1 includes physical connections to the device under test (e.g., IoT device 135(1)). The connections are positioned between MCUs on the device where the original communication circuits have been severed or disabled (e.g., as shown in FIG. 3), allowing communication between the MCUs to be rerouted through the inter-chip communication data analysis and manipulation system (e.g., IoT security server 105). This permits IoT security server 105 to proxy data between the MCUs using the appropriate communication protocol (e.g., provided by communication protocol manager 120).

Example of Capture, Analysis, Modification, and Replay

Figure 11:
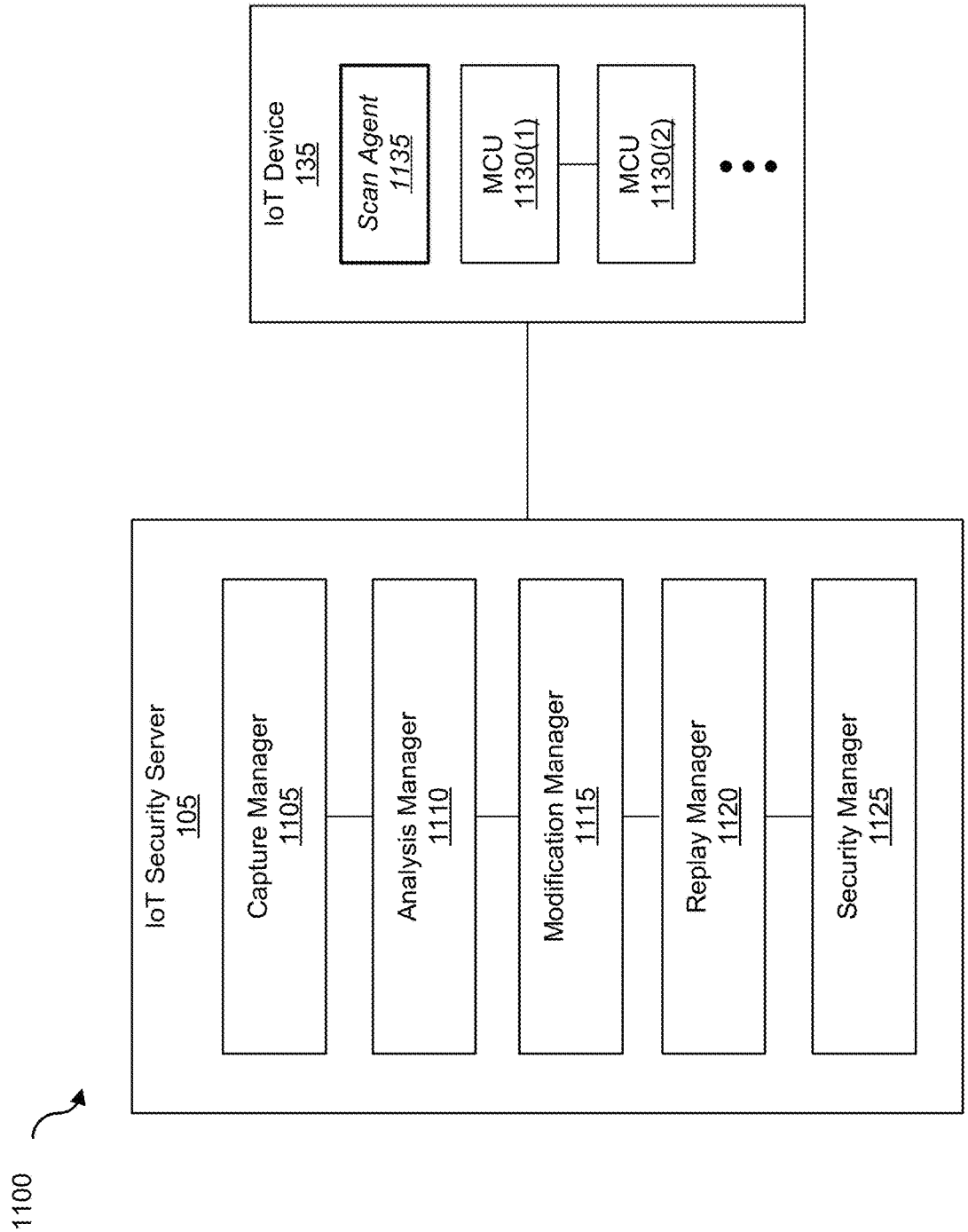
FIG. 11 is a block diagram 1100 that illustrates another example of an IoT security server, according to one embodiment of the present disclosure.

In one embodiment, and as shown in FIG. 11, data is captured alongside transmission timing and flow direction. In this example, the captured data can be serialized to a file system for analysis or replay at a future point in time. In another embodiment, data analysis includes at least identifying the data communication direction, identifying address formats, identifying flow control, identifying data communication timings, and identifying data communication structures (including but not limited to data transmission unit start and end delimiters, or length patterns). In some embodiments, a modification operation provides the ability to change data in real-time or via the replay functionality. Data pattern recognition can be used to identify data the system will modify and selected portions of the data being communicated can be modified based on sets of replacement patterns or programmatic filtering provided by a user. In addition, support for adding or updating error detection and correction values in the data, including but not limited to checksum, CRC, cryptographic hash function, and error correction code is also contemplated. In other embodiments, the replay operations provide the ability to repeat previously captured data (e.g., user created or programmatically generated data in the user specified data flow).

As shown in FIG. 11, IoT security server 105 can perform vulnerability identification and vulnerability remediation operations on IoT devices (e.g., IoT device 135). Advantageously, IoT device 135 includes a scan engine 1135 that scans, captures, and manages inter-chip communication(s) between MCUs 1130(1)-(N). In some embodiments, scan engine 1135 identifies vulnerable MCUs and IoT devices based on a message start delimiter, a device command, an encoded MAC address, a validation key, and/or a checksum modulo—which are part of an identified message structure in inter-chip communication(s). Changes in a message's (e.g., open-close command's) structure and/or content can be identified using a replay test or fuzzing test performed by IoT security server 105.

Capture manager 1105 captures inter-chip communication between MCUs 1130(1)-(N), analysis manager 1110 analyzes the content of command messages between the MCUs, modification manager 1115 modifies the message (or parts thereof) to identify variations and/or vulnerabilities, replay manager 1120 replays the message to identify variations and/or vulnerabilities, and security manager 1125 performs vulnerability remediation. Scan agent 1135 can then apply patches or perform other security operations to secure MCU communications and fix vulnerabilities on IoT device 135.

Example Process to Remediate Vulnerabilities Based on Inter-Chip Communication

Figure 12:
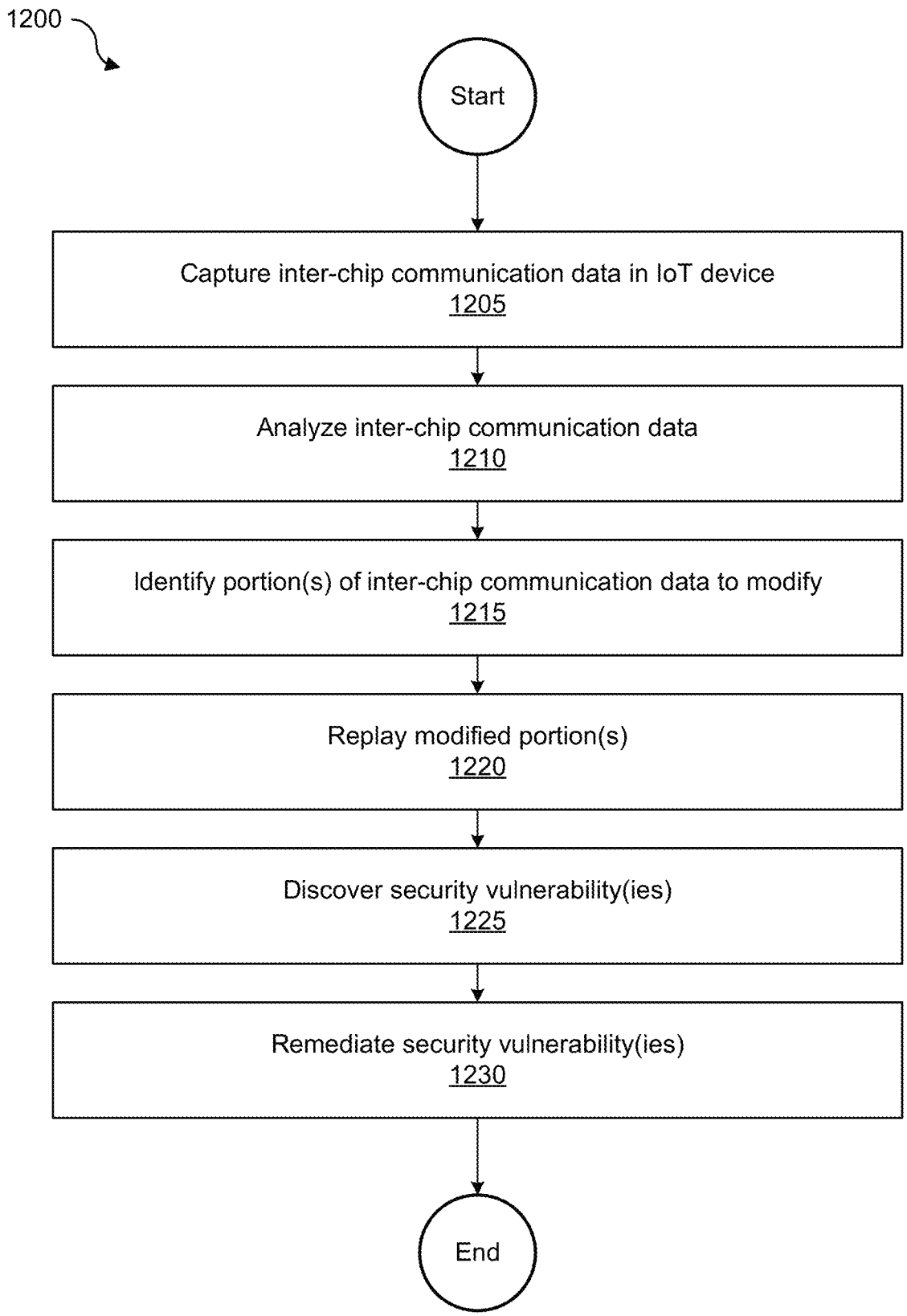
FIG. 12 is a flowchart 1200 that illustrates a process for manipulating inter-chip communications for IoT security, according to one embodiment of the present disclosure.

FIG. 12 is a flowchart that illustrates a process to discover/identify and remediate security vulnerabilities in IoT devices based on inter-chip communications between MCUs of such devices, according to one embodiment. The process begins at 1205 by capturing inter-chip communication data in an IoT device (e.g., captured by scan agent 1135 and sent to capture manager 1105 of IoT security server 105). At 1210, the process analyzes the inter-chip communication data (e.g., using analysis manager 1110), and at 1215, identifies portion(s) of inter-chip communication data to modify. At 1220, the process replays the modified portion(s) and at 1225, discovers one or more security vulnerabilities. The process ends at 1230 by remediation the (identified) security vulnerabilities.

Advantageously, analyzing and manipulating inter-chip communication in IoT devices in the foregoing manner, permits discovery and remediation of security vulnerabilities in unencrypted low/device-level communications.

Example Computing & Networking Environment

Figure 13:
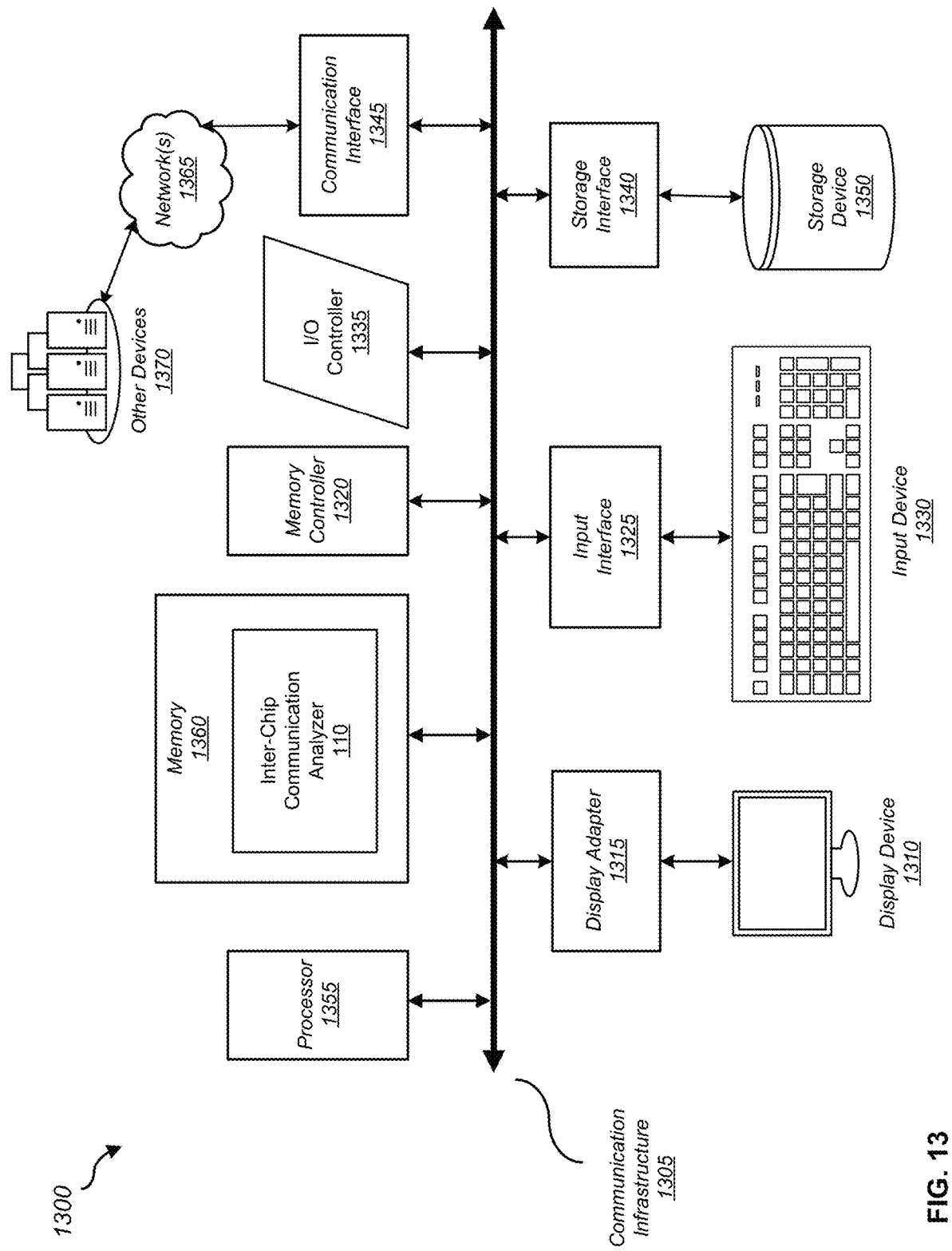
FIG. 13 is a block diagram 800 of a computing and networking system, illustrating how an inter-chip communication analyzer can be implemented in software and how various devices can communicate via a network, according to one embodiment of the present disclosure.

FIG. 13 is a block diagram 1300 of a computing system, illustrating how an inter-chip communication analyzer can be implemented in software, according to one embodiment. Computing system 1300 can include IoT security server 105 and broadly represents any single or multi-processor computing device or system capable of executing computer-readable instructions. In its most basic configuration, computing system 1300 may include at least one processor 1355 and a memory 1360. By executing the software that executes inter-chip communication analyzer 110, computing system 1300 becomes a special purpose computing device that is configured to manipulate inter-chip communication(s) in IoT devices for the purpose of at least identifying and remediating security vulnerabilities.

Processor 1355 generally represents any type or form of processing unit capable of processing data or interpreting and executing instructions. In certain embodiments, processor 1355 may receive instructions from a software application or module. These instructions may cause processor 1355 to perform the functions of one or more of the embodiments described and/or illustrated herein. Processor 1355 may also perform and/or be a means for performing any other operations, methods, or processes described and/or illustrated herein. Memory 1360 generally represents any type or form of volatile or non-volatile storage devices or mediums capable of storing data and/or other computer-readable instructions. In one example, program instructions implementing inter-chip communication analyzer 110 may be loaded into memory 860.

Many other devices or subsystems may be connected to computing system 1300, some of which are shown in FIG. 13. Conversely, all of the components and devices illustrated in FIG. 13 need not be present to practice the embodiments described and/or illustrated herein. The devices and subsystems referenced above may also be interconnected in different ways from that shown in FIG. 13. The embodiments disclosed herein may be encoded as a computer program (also referred to as computer software, software applications, computer-readable instructions, or computer control logic) on a computer-readable storage medium. Such computer programs can also be transferred to computing system 1300 for storage in memory via a network such as the Internet or upon a carrier medium. The computer-readable medium containing the computer program may be loaded into computing system 800. All or a portion of the computer program stored on the computer-readable medium may then be stored in memory 1360, and/or various portions of storage device 1350. When executed by processor 1355, a computer program loaded into computing system 1300 may cause processor 1355 to perform and/or be a means for performing the functions of one or more of the embodiments described/illustrated herein. Alternatively, one or more of the embodiments described and/or illustrated herein may be implemented in firmware and/or hardware.

Network 150 generally represents any type or form of computer network or architecture capable of facilitating communication between IoT security server 105 and IoT devices 135(1)-(N). For example, network 150 can be a Wide Area Network (WAN) (e.g., the Internet) or a Local Area Network (LAN). In certain embodiments, a communication interface, such as communication interface 1345 in FIG. 13, may be used to provide connectivity between IoT security server 105 and IoT devices 135(1)-(N), and network 150. The embodiments described and/or illustrated herein are not limited to the Internet or any particular network-based environment.

In some examples, all or a portion of IoT security server 105 and/or IoT devices 135(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
    capturing inter-chip communication data in an Internet of Things (IoT) device;
    identifying a communication direction, an address format, a flow control, a communication timing, and a communication structure associated with the inter-chip communication;
    based on the communication direction, the address format, the flow control, the communication timing, and the communication structure, identifying one or more portions of the inter-chip communication data that require modification so that the inter-chip communication data can be replayed;
    identifying one or more security vulnerabilities based on the modification and the replaying; and
    remediating the one or more security vulnerabilities in the IoT device.

2. The computer-implemented method of claim 1, further comprising:
    serializing the captured inter-chip communication data to a file system associated with the IoT device.

3. The computer-implemented method of claim 1, wherein
    the data communication structure comprises a data transmission unit start delimiter, a data transmission unit end delimiter, and at least a length pattern.

4. The computer-implemented method of claim 1, wherein
    the one or more portions of the inter-chip communication data are identified for modification based on data pattern recognition, and
    the one or more portions of the inter-chip communication data are modified based on one or more sets of replacement patterns.

5. The computer-implemented method of claim 1, wherein
    the IoT device is communicatively coupled to a breakout board.

6. A non-transitory computer readable storage medium comprising program instructions executable to:
    capture inter-chip communication data in an Internet of Things (IoT) device;
    identify a communication direction, an address format, a flow control, a communication timing, and a communication structure associated with the inter-chip communication;
    based on the communication direction, the address format, the flow control, the communication timing, and the communication structure, identify one or more portions of the inter-chip communication data that require modification so that the inter-chip communication data can be replayed;
    identify one or more security vulnerabilities based on the modification and the replaying; and
    remediate the one or more security vulnerabilities in the IoT device.

7. A system comprising:
    one or more processors; and
    a memory coupled to the one or more processors, wherein the memory stores program instructions executable by the one or more processors to:
    capture inter-chip communication data in an Internet of Things (IoT) device;
    identify a communication direction, an address format, a flow control, a communication timing, and a communication structure associated with the inter-chip communication;
    based on the communication direction, the address format, the flow control, the communication timing, and the communication structure, identify one or more portions of the inter-chip communication data that require modification so that the inter-chip communication data can be replayed;
    identify one or more security vulnerabilities based on the modification and the replaying; and remediate the one or more security vulnerabilities in the IoT device.

* * * * *